US010219487B2

United States Patent
Hasegawa et al.

(10) Patent No.: US 10,219,487 B2
(45) Date of Patent: Mar. 5, 2019

(54) PET TOILET SHEET COVER MEMBER AND PET TOILET USING SAME

(71) Applicant: UNICHARM CORPORATION, Ehime (JP)

(72) Inventors: Satoshi Hasegawa, Kagawa (JP); Takayuki Matsuo, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 15/522,907

(22) PCT Filed: Oct. 14, 2015

(86) PCT No.: PCT/JP2015/079086
§ 371 (c)(1),
(2) Date: Apr. 28, 2017

(87) PCT Pub. No.: WO2016/067922
PCT Pub. Date: May 6, 2016

(65) Prior Publication Data
US 2017/0318773 A1  Nov. 9, 2017

(30) Foreign Application Priority Data
Oct. 31, 2014 (JP) ................................. 2014-223784

(51) Int. Cl.
*A01K 1/015* (2006.01)
*A01K 1/01* (2006.01)
*A01K 23/00* (2006.01)

(52) U.S. Cl.
CPC .......... *A01K 1/0157* (2013.01); *A01K 1/0107* (2013.01); *A01K 23/00* (2013.01)

(58) Field of Classification Search
CPC ..... A01K 1/0107; A01K 1/015; A01K 1/0125
(Continued)

(56) References Cited

U.S. PATENT DOCUMENTS 2,741,223 A * 4/1956 Winborn, Jr. ........ A01K 1/0107
119/165
3,358,647 A * 12/1967 Wilson ................. A01K 1/0107
119/169
(Continued)

FOREIGN PATENT DOCUMENTS

EP          2368425 A1    9/2011
JP       2005-287367 A   10/2005
(Continued)

OTHER PUBLICATIONS

Written Opinion in PCT Application No. PCT/JP2015/079086, dated Jan. 19, 2016.
(Continued)

*Primary Examiner* — Magdalena Topolski
(74) *Attorney, Agent, or Firm* — Hauptman Ham, LLP (57) ABSTRACT

The cover member mounted on a toilet sheet spread over a floor surface and absorbing excreta from a pet, is provided to have a configuration that first members each having a bottom surface for contact with a floor surface are disposed in a first end region of the bottom section, ribs each having a bottom surface, at least a portion of the bottom surface being for contact with a top surface of the toilet sheet, are provided in a middle region, and second members each having a bottom surface for contact with a top surface of the toilet sheet are provided in a second end region.

6 Claims, 6 Drawing Sheets

(58) Field of Classification Search
USPC .................................. 119/165, 161, 169, 168
See application file for complete search history.

(56) References Cited

U.S. PATENT DOCUMENTS

| | | | | |
|---|---|---|---|---|
| 3,386,417 A * | 6/1968 | Machowski | ......... | A01K 1/0107 119/169 |
| 4,147,129 A * | 4/1979 | Ruplen | ................ | A01K 1/0353 119/169 |
| 5,630,376 A * | 5/1997 | Ochi | .................... | A01K 1/0107 119/169 |
| 6,550,423 B1 | 4/2003 | Pope | | |
| 7,128,023 B2 * | 10/2006 | Otsuji | .................. | A01K 1/0107 119/169 |
| 8,220,622 B1 * | 7/2012 | Lewis | .................. | A01K 1/0107 119/168 |
| 2001/0025910 A1 * | 10/2001 | Olivadoti | ............ | A01K 1/0107 248/346.01 |
| 2002/0112669 A1 * | 8/2002 | Holt, Jr. | ................ | A01K 1/0157 119/161 |
| 2006/0137620 A1 * | 6/2006 | Joy | ....................... | A01K 1/0107 119/165 |
| 2009/0194033 A1 * | 8/2009 | Modlin | ................ | A01K 1/0107 119/167 |
| 2011/0052838 A1 * | 3/2011 | Levkovitch | .......... | A01K 1/0125 428/12 |
| 2011/0139082 A1 * | 6/2011 | Blagden | ............... | A01K 1/0107 119/171 |
| 2013/0171597 A1 * | 7/2013 | Kong | .................... | A01K 1/0107 434/247 |
| 2013/0327278 A1 * | 12/2013 | Reichert | .............. | A01K 1/0114 119/167 |
| 2014/0360436 A1 * | 12/2014 | Kong | ................... | A01K 1/0107 119/163 |
| 2016/0302380 A1 | 10/2016 | Hasegawa et al. | | |
| 2017/0196194 A1 * | 7/2017 | Wild | ..................... | A01K 1/0157 |
| 2017/0280671 A1 * | 10/2017 | Miller | .................. | A01K 1/0107 |

FOREIGN PATENT DOCUMENTS

| | | |
|---|---|---|
| JP | 3154900 U | 10/2009 |
| JP | 2010-233583 A | 10/2010 |
| JP | 2012-509057 A | 4/2012 |
| JP | 5655132 B1 | 1/2015 |
| WO | 2010/003794 A1 | 1/2010 |
| WO | 2015/098135 A1 | 7/2015 |

OTHER PUBLICATIONS

International Search Report in PCT Application No. PCT/JP2015/079086, dated Jan. 19, 2016.

* cited by examiner

PET TOILET SHEET COVER MEMBER AND PET TOILET USING SAME

RELATED APPLICATIONS

The present application is a National Phase of International Application Number PCT/JP2015/079086, filed Oct. 14, 2015, which claims priority of Japanese Application No. 2014-223784, filed Oct. 31, 2014.

TECHNICAL FIELD

The present invention relates to a pet toilet sheet cover member and to a pet toilet using the same.

BACKGROUND ART

In recent years, a pet toilet for treatment of excreta of a pet that is kept indoor has been designed, in which a pet toilet sheet that is able to absorb liquids is set on top of a pan-like tray that is placed on the floor surface, and a frame member is mounted on the tray to press down the toilet sheet (see Patent Literature 1, for example).

Such a pet toilet, however, has a layered structure composed of three layers: the tray, the toilet sheet and the frame member, and this necessarily increases the height of the toilet, particularly the height from the floor surface to the highest section of the frame member. Pets, and especially dogs, tend to dislike passing over frame members that are very high from the floor surface, and therefore may fail to enter onto the toilet sheet, often resulting in difficulty in excreting into the toilet.

In order to overcome problems caused by height, therefore, a pet toilet has been devised that is of the type described in Patent Literature 2, for example, in which the toilet sheet is spread directly onto the floor surface to eliminate the lowermost tray on which the toilet sheet is set. Such a pet toilet is generally constructed so that when the toilet sheet is directly spread onto the floor surface, such as flooring, portions of the toilet sheet are covered and pressed with the toilet sheet cover member. Such a construction is advantageous in that it is possible to reduce the height of the pet toilet by the amount of the eliminated tray, and to therefore reduce the height from the floor surface to the uppermost section of the cover member, so that the pet can pass over the cover member and enter the toilet sheet more easily.

However, because such a type of a pet toilet basically has the toilet sheet merely pressed down by the cover member, there has been one problem that when the pet steps its leg onto the cover member when it enters the toilet sheet, or when the pet enters onto the toilet sheet energetically, the cover member tends to shift on the toilet sheet and the location of the pet toilet on the floor surface also tends to shift.

Moreover, when the pet has excreted urine vigorously near the cover member, the urine can flow out of the toilet sheet through the gap between the bottom surface of the cover member and the top surface of the toilet sheet.

CITATION LIST

Patent Literature

[PTL 1] Japanese Unexamined Patent Publication No. 2010-233583

[PTL 2] Japanese Unexamined Patent Publication No. 2005-287367

SUMMARY OF INVENTION

Technical Problem

In light of the problems mentioned above, it is an object of the present invention to provide a pet toilet sheet cover member having a simple and compact structure that prevents shifting of the pet toilet sheet and can prevent urine on the toilet sheet from flowing out of the toilet sheet, as well as a pet toilet using the same.

Solution to Problem

In order to solve the aforementioned problems, the pet toilet sheet cover member of the present invention has the following construction.

(1) A pet toilet sheet cover member, which is a cover member mounted on a pet toilet sheet that is spread over a floor surface and absorbs excreta from a pet, and that serves to press down the pet toilet sheet in a partially covered state, wherein the cover member has a first end and a second end located in a direction opposite the first end in a horizontal direction, and includes: a top section; a bottom section; a first member; a rib; and a second member, the bottom section has a first end region that includes an edge section on the first end, a second end region that includes an edge section on the second end and a middle region between the second end region and the first end region, the first member having a bottom surface for contact with a floor surface is disposed in the first end region, the rib having a bottom surface, at least a portion of the bottom surface being for contact with a top surface of the toilet sheet, is provided in the middle region, the rib extending from the first end toward the second end, and the second member having a bottom surface for contact with a top surface of the toilet sheet is provided in the second end region, the second member being disposed extending along the edge section of the second end.

(2) The pet toilet sheet cover member according to (1) above, wherein the second member is disposed at a location away from the edge section on the second end in a direction of the first end.

(3) The pet toilet sheet cover member according to (1) or (2) above, wherein the rib has a recess formed in a curved shape that is curved in a convex manner upward at a location adjacent to the second end region.

(4) The pet toilet sheet cover member according to any one of (1) to (3), wherein a height of the bottom surface at the second end in a vertical direction is higher than a height of the bottom surface of the second member in the vertical direction, the height of the bottom surface of the second member in the vertical direction is higher than height of the bottom surface of the rib and the bottom surface of the first end in the vertical direction, and the heights of the bottom surface of the rib and the bottom surface of the first end in the vertical direction are higher than a height of the bottom surface of the first member in the vertical direction.

(5) The pet toilet sheet cover member according to any one of (1) to (4) above, wherein the first member is disposed away from the edge section at the first end in a direction of the second end.

(6) The pet toilet sheet cover member according to any one of (1) to (5) above, wherein the cover member is formed as a frame with the second end located on an inner perimeter side.

In order to solve the problems described above, the pet toilet of the present invention also has the following construction.

(7) A pet toilet comprising: a pet toilet sheet cover member according to any one of (1) to (6) above; and a pet toilet sheet on a top surface of which the cover member is to be mounted, wherein the pet toilet sheet comprises a liquid-permeable top sheet, a liquid-impermeable back sheet, and a liquid-absorbing absorbent body disposed between the top sheet and back sheet.

Advantageous Effects of Invention

According to the present invention, the bottom surfaces of the second members, disposed extending along the edge section on the second end of the cover member, are contacted with the top surface of the toilet sheet spread out on the floor surface, while the bottom surfaces of the first members are contacted with the floor surface. Thus, the first members can prevent shifting between the floor surface and the cover member and shifting between the toilet sheet and the cover member, while the second members can block flow of urine on the top sheet.

Therefore, with a simple overall construction, the height can be rendered more compact while preventing shifting of the pet toilet sheet and blocking urine on the toilet sheet.

DESCRIPTION OF EMBODIMENTS

A preferred embodiment of a pet toilet sheet cover member of the present invention and a pet toilet using the same will now be explained in detail with reference to the accompanying drawings.

FIG. 1 to FIG. 5A show a pet toilet according to a first embodiment of the present invention.

Figure 1:
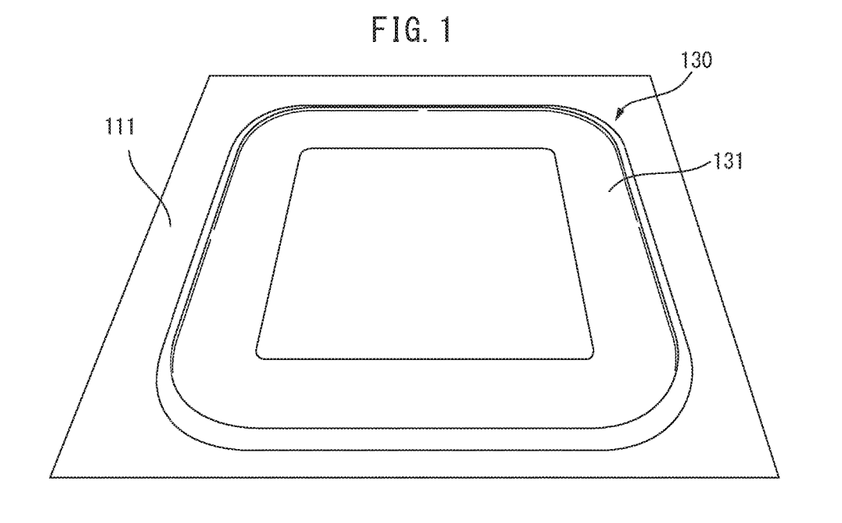
FIG. 1 is a schematic perspective view of a cover member to be used in a pet toilet according to a first embodiment of the present invention.
Figure 2:
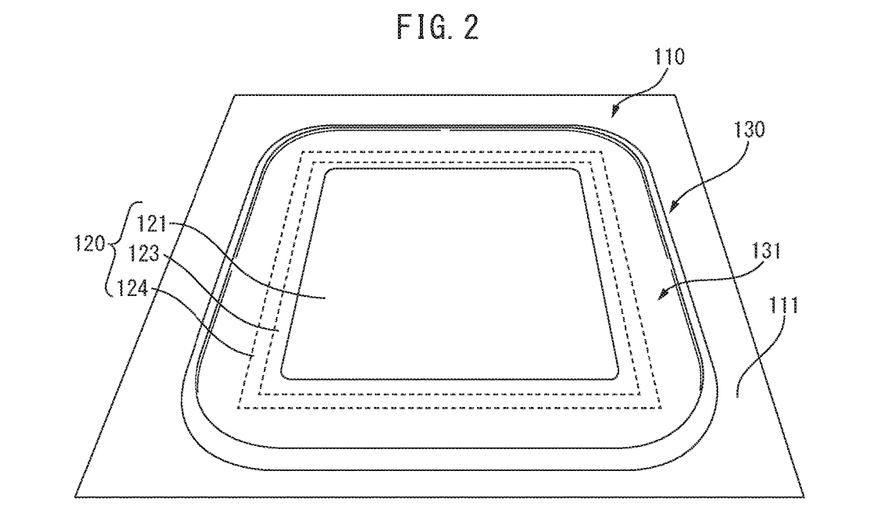
FIG. 2 is a diagram schematically showing a state of a cover member according to the first embodiment of the present invention, before the cover member is placed on the pet toilet sheet.
Figure 3:
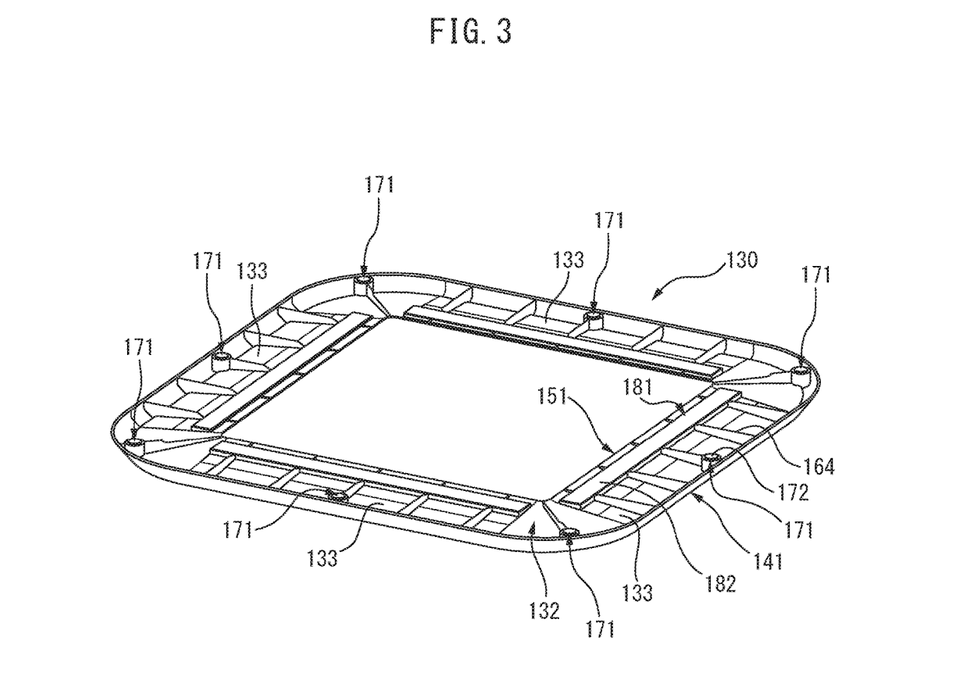
FIG. 3 is a schematic perspective view of a pet toilet according to the first embodiment of the present invention.

The pet toilet 110 of this embodiment includes a pet toilet sheet 120 that absorbs excreta of a pet, and a cover member 130 set on the toilet sheet 120, serving to press down the toilet sheet with the toilet sheet 120 in a partially covered state. The pet toilet 110 is used by directly spreading out the toilet sheet 120 at a prescribed location of a floor surface 111, and pressing down the toilet sheet 120 by the cover member 130 set so as to partially cover it.

For this embodiment, the cover member 130 is formed as an essentially square-shaped frame having an essentially square-shaped inner perimeter edge and outer perimeter edge, as viewed flat.

For the purpose of the present invention, the term "floor surface" means the actual surface of the floor, without a conventional pan-shaped tray, and for example, it includes the concept of not only a flooring or tatami mat, but also a floor surface covered with a spread mat such as a carpet, that is not part of the pet toilet.

Figure 5:
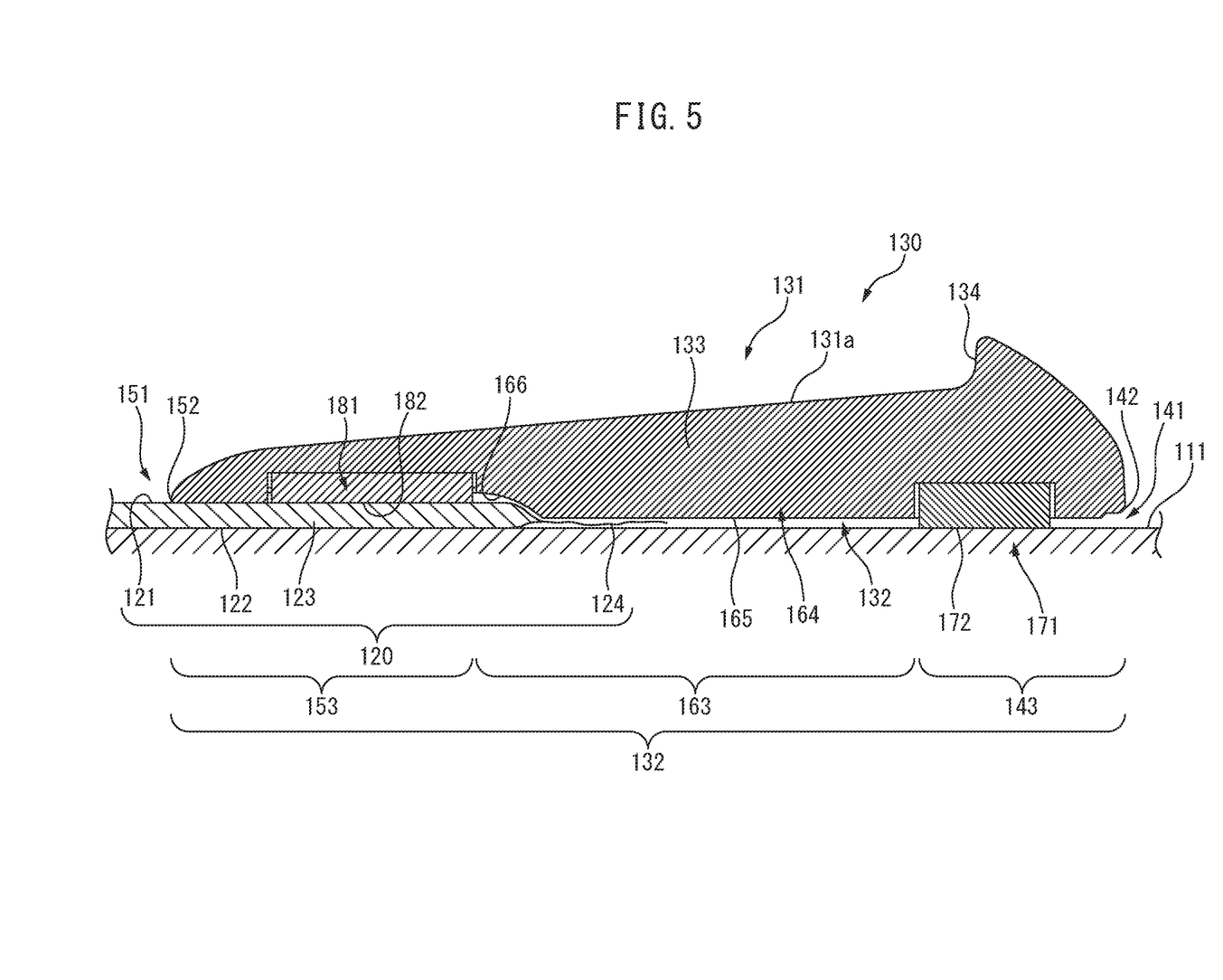
FIG. 5 is an end view, along line V-V of FIG. 4, of the cover member according to the first embodiment of the present invention, in a state after the cover member has been placed on the pet toilet sheet.
Figure 5A:
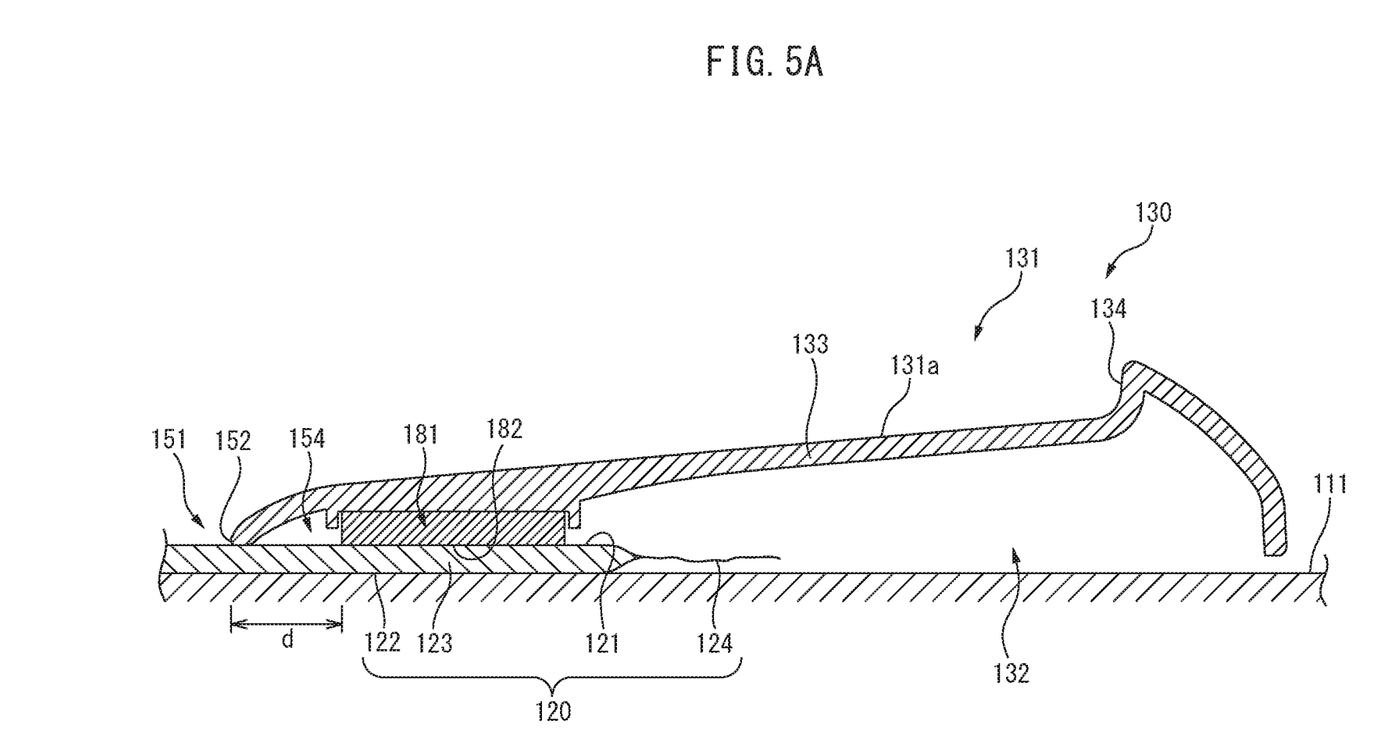
FIG. 5A is an end view, along line VA-VA of FIG. 4, of the cover member according to the first embodiment of the present invention, in a state after the cover member has been placed on the pet toilet sheet.

The toilet sheet 120 includes a liquid-permeable top sheet 121 and a liquid-impermeable back sheet 122, and a liquid-absorbing absorbent body 123 disposed between the top sheet 121 and the back sheet 122. With this construction, urine excreted by the pet is absorbed into the absorbent body 123 through the top sheet 121, and held.

For this embodiment, the toilet sheet 120 is an essentially square-shaped sheet as viewed flat.

Specifically, the absorbent body 123 has an essentially square shape, as viewed flat, which is smaller than the top sheet 121 and the back sheet 122 that have essentially square shapes as viewed flat, and it is disposed at the center section between the top sheet 121 and the back sheet 122, as viewed flat. Also, the top sheet 121 and back sheet 122 are overlaid together at the outer perimeter edge portions where the absorbent body 123 is not present, and mutually joined at the overlaid portions, with flap sections 124 being formed as the outer perimeter edges of the toilet sheet 12.

For the top sheet, there is used a liquid-permeable sheet-like material such as a nonwoven fabric. For the back sheet, there is used a liquid-impermeable sheet-like material such as a film. The absorbent body is formed of pulp, an absorbent polymer, or a liquid-absorbing material molded as a mixture thereof.

The top sheet 121 of the toilet sheet 120 may be provided with a mark (not shown) at the location corresponding to the inner perimeter edge of the cover member 130, to allow the user to place the cover member 130 at the appropriate location with respect to the toilet sheet 120.

The mark may be printed on the top sheet 121, for example. This will allow the user to place the cover member 130 at the appropriate location on the toilet sheet 120, to more stably minimize positional shifting between the cover member 130 and the toilet sheet 120 caused by activity of the pet, as described below, or outflow of pet urine from the pet sheet.

The cover member 130 includes a plate-like base section 133 constituting the main body of the cover member 130, a top section 131 located on the top surface of the base section 133, and a bottom section 132 located on the surface of the base section 133 opposite the top section 131.

The top section 131 has a main function of guiding urine that has dropped onto the cover member 130 (base section 133) to the toilet sheet 120, and the bottom section 132 has a function of preventing shifting between the cover member 130 and the floor surface 111 and shifting between the cover member 130 and the toilet sheet 120, and a function of blocking urine on the toilet sheet 120.

The base section 133 of the cover member 130 has a first end 141, and a second end 151 located in the opposite direction horizontally with respect to the first end 141.

More specifically, the cover member 130 of this embodiment is formed as an essentially square-shaped frame, as viewed flat, by four base sections 133 that are long in one direction, each of the base sections 133 forming one side of the frame-like cover member 130. Also, the construction is such that the first end 141 in one widthwise direction of each of the base sections 133 is located on the outer perimeter side of the frame, while the second end 151 in the other widthwise direction is located on the inner perimeter side of the frame.

The edge of the second end 151 of the base sections 133 (the inner perimeter edge of the cover member 130) and the section of the edge of the first end 141 (the outer perimeter edge of the cover member 130) corresponding to the edge of the second end 151, extend in essentially parallel directions.

Also, the outer perimeter sides of adjacent base sections 133, 133 (the first end 141 sides) are integrally connected in a gently curved state as viewed flat, so that the cover member 130 as a whole has four gently curved chamfered corners. This allows a pet such as a dog to easily place its legs onto the cover member 130 from any position.

As shown in FIG. 5, the construction is such that the top section 131 of the cover member 130 includes an inclined surface 131a inclined downward from the first end 141 of the base section 133 toward the second end 151, and a standing wall section 134 provided on the first end 141 side of the inclined surface 131a and rising upward from the base section 133. For this embodiment, the inclined surface 131a is formed on the top section 131 by the base section 133 inclining downward from the first end 141 toward the second end 151.

The standing wall section 134 is provided in a continuous manner along the outer perimeter edge of the cover member 130, across the entire periphery of the cover member 130. Also, the top edge portion of the standing wall section 134 is the highest location of the cover member 130.

This allows pet urine that has fallen down onto the inclined surface 131a to flow from the top section 131 toward the second end 151 without pooling in the cover member 130, finally falling down onto the toilet sheet 120 and being absorbed into the absorbent body 123.

On the other hand, when pet urine that has fallen down onto the inclined surface 131a attempts to move to the first end 141 side against the incline of the inclined surface 131a by energy during falling, its movement is stopped by the standing wall section 134, and splashing of urine from the first end 141 side can be minimized. Furthermore, since the standing wall section 134 is provided continuously across the entire periphery of the cover member 130, it can more stably reduce splashing of urine from the first end 141 side.

Figure 4:
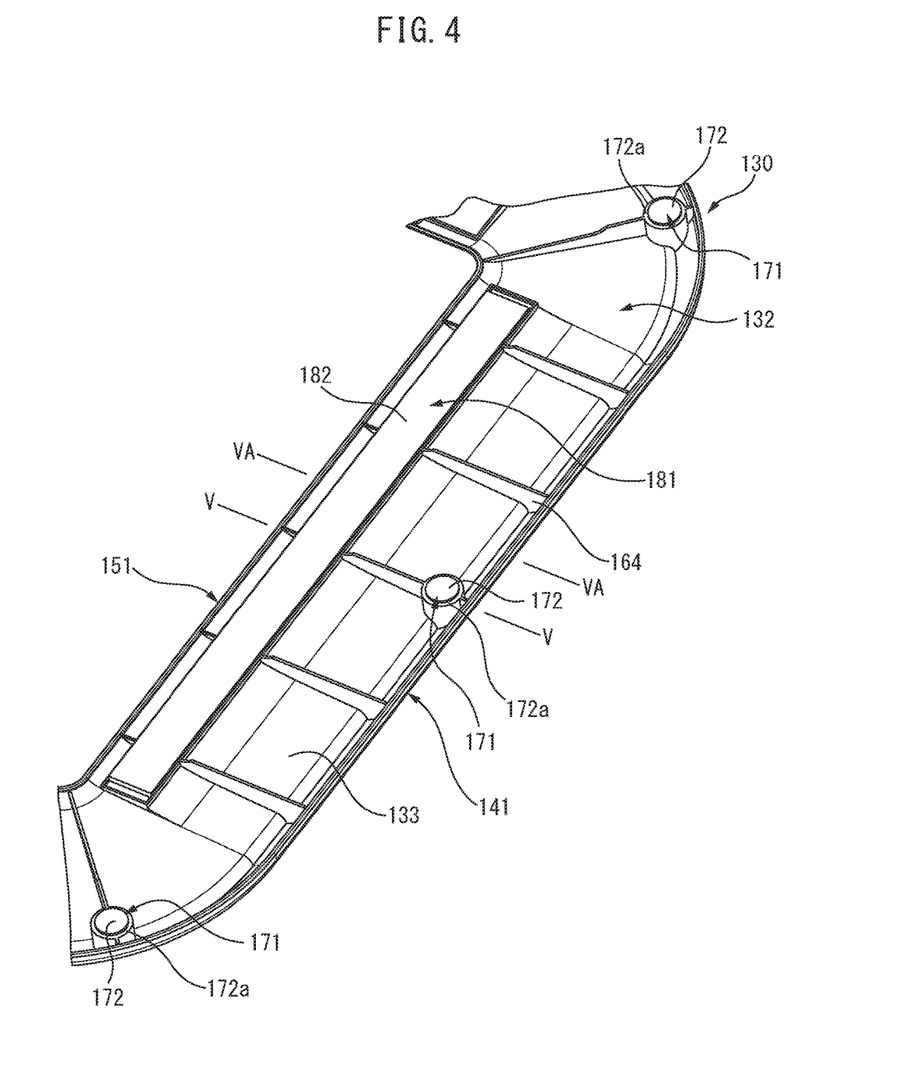
FIG. 4 is a schematic partial magnified perspective view of a cover member according to the first embodiment of the present invention, as seen from below.

The bottom section 132 of the cover member 130 has, from the first end 141 of the base section 133 toward the second end 151, a first end region 143 that reaches from the edge section 142 of the first end 141 to a first anti-slip member 171 described below, a second end region 153 that reaches from a second anti-slip member 181 described below to the edge section of the second end 151, and a middle region 163 including the ribs 164 described below, disposed between the first end region 143 and the second end region 153.

The first end region 143 includes first members for contact with the floor surface 111. For this embodiment, the first anti-slip member 171 that functions to prevent slipping against the floor surface is disposed as the first member, and it is able to contact with the floor surface 111 on its bottom surface 172.

As shown in FIG. 4, this embodiment has the first anti-slip member 171 with an axis line extending in the vertical direction and formed in an essentially cylindrical shape with a flat bottom surface 172, a portion of the upper side being bonded while housed in a cylindrical housing section 172a extending downward vertically from the base section 133. The bottom surface 172 of the first anti-slip member 171 is formed flat for this embodiment.

The first anti-slip member 171 of this embodiment is formed in an essentially cylindrical shape as already mentioned, but it may instead have any desired shape such as square columnar or hemispherical. Also, although the bottom surface 172 is a flat surface for this embodiment, it may instead have another shape such as hemispherical. It may also extend continuously in the lengthwise direction of the base section 133.

For this embodiment, the height of the bottom surface 172 of the first anti-slip member 171 in the vertical direction is the lowest of the regions of the bottom section 132 of the cover member 130. That is, the bottom surface 172 of the first anti-slip member 171 is disposed at a location protruding furthest downward of the regions of the bottom section 132.

With this construction, when the cover member 130 is pressed down covering a portion of the toilet sheet 120, the floor surface 111 can be contacted with only the bottom surfaces 172 of the first anti-slip members 171 of the cover member 130. Consequently, even if the pet has kicked the cover member 130, for example, frictional force acts between the cover member 130 and the floor surface 111 under the gravitational weight of the cover member 130, thereby minimizing movement of the cover member 130 and helping to prevent shifting between the cover member 130 and the floor surface 111. The location of the toilet 110 as a whole therefore does not shift on the floor surface 111.

Also, each first anti-slip member 171 is situated at a location separated from the edge section 142 of the first end 141 in the direction of the second end 151, on the bottom section 132. With such a construction, even if pet urine has fallen down onto the floor surface 111 along the edge section 142 of the first end 141 of the cover member 130, since the space surrounded by the first anti-slip member 171, the edge section 142 of the first end 141 and the floor surface 111 performs the role of a buffer, it is possible to help prevent or delay urine from reaching the first anti-slip member 171.

Consequently, shifting between the cover member 130 and the floor surface 111 can be prevented without wetting of the bottom surface 172 of the first anti-slip member 171 and loss of its anti-slip function, and locational shifting of the toilet 110 as a whole on the floor surface 111 can be more stably prevented.

The first anti-slip member 171 in this case is preferably separated from the edge section 142 of the first end 141 by about 1 mm to 50 mm, more preferably about 3 mm to 30 mm and even more preferably about 5 mm to 10 mm, in the direction of the second end 151. If it is less than 5 mm, liquid that has fallen on the outer side will enter between the first anti-slip member and the floor surface, weakening the frictional force and potentially interfering with the function as an anti-slip member. If it is greater than 10 mm, it will tend to incline outward (in the direction of the edge section of the first end) when the pet has stepped onto a section near the outer side of the cover member (more specifically the edge section of the first end), thus preventing the cover member from contacting the sheet.

Incidentally, for this embodiment, one first anti-slip member 171 is provided near each of the four corners of the square frame-shaped cover member 130, and one each near the centers of the sides, but the number of first anti-slip members may be as desired.

Also, the material of the first anti-slip member 171 is preferably an elastic material such as rubber, whereby an anti-slip function is exhibited against the floor surface by the elasticity.

The second end region 153 includes a second member for contact with the top surface of the toilet sheet 120. For this embodiment, a second anti-slip member 181 that functions to prevent slipping against the toilet sheet 120 is provided as the second member, and it contacts with the top surface of the toilet sheet 120 at the bottom surface 182, which is a flat surface.

Also, the height of the bottom surface 182 of the second anti-slip member 181 in the vertical direction is lower than the height of the bottom surface of the second end 151 in the vertical direction, and higher than the heights of the bottom surfaces of the ribs 164 and the bottom surface of the first end 141 in the vertical direction, as described below. With this positional relationship, when the cover member 130 is pressed down covering a portion of the toilet sheet 120, the second anti-slip member 181 can be contacted with the top surface of the toilet sheet 120 by pressing force due to the action of the gravitational weight of the cover member 130. This produces frictional force between the second anti-slip member 181 and the toilet sheet 120 to prevent relative shifting between the toilet sheet 120 and the cover member 130 even when the pet kicks the toilet sheet 120, thereby preventing wrinkling in the toilet sheet 120 due to shifting of the cover member 130.

Each second anti-slip member 181 is formed as a rectangular plate-like shape with a predetermined width and thickness, as viewed flat, extending in the lengthwise direction of the base section 133 along the edge section 152 of the second end 151. For this embodiment, the edge section 152 of the second end 151 of the cover member 130 has a continuous construction, but it may instead be a discontinuous edge section or have a partial construction. The structure of "extending along the edge section of the second end" according to the present invention, includes not only a construction in which the second anti-slip member extends along the continuous edge section of the second end, but also a construction in which the second anti-slip member extends along the discontinuous edge section or partial edge section of the second end. For this embodiment, each second anti-slip member 181 is fixed in a positionally immovable manner on the bottom surface of the base section 133 with the bottom surface 182 in an essentially horizontal position, when the cover member 130 is placed on the toilet sheet 120.

Also, the length of the second anti-slip member 181 is approximately the same length as the edge section 152 on the second end 151 of the base section 133 (that is, one side on the inner perimeter edge of the cover member 130.

With this construction, the bottom surface 182 of the second anti-slip member 181 contacts the surface of the toilet sheet 120 and can prevent shifting between the toilet sheet 120 and the cover member 130.

Moreover, contact of the bottom surface 182 of the second anti-slip member 181 with the surface of the toilet sheet 120 blocks the gap between the bottom surface 182 and the toilet sheet 120. Therefore, even when pet urine has been transferred to the top sheet 121 of the toilet sheet 120 and has flowed in from the edge section 152 of the second end 151 to the bottom section 132 side of the cover member 130, the second anti-slip member 181 can block the flow of urine. This can keep urine that has been blocked by the second anti-slip member 181 from reaching the flap sections 124 at the outer edges of the toilet sheet 120, absorbing it into the absorbent body 123 through the top sheet 121 in order to stably prevent urine from flowing through the bottom section 132 and out of the toilet sheet 120.

The second anti-slip member 181 is situated at a location separated from the edge section 152 of the second end 151 in the direction of the first end 141. That is, the lengthwise part of the second anti-slip member 181 on the second end 151 side of the base section 133 and the edge section 152 of the second end 151 are separated by a predetermined distance.

Also, since the base section 133 is inclined downward toward the second end side as mentioned above, the height of the space 154 between the second anti-slip member 181 and the edge section 152 of the second end 151 is higher than the location of the edge section 152 of the second end 151. Thus, when the cover member 130 is set on the toilet sheet 120, the space surrounded by the second anti-slip member 181, the edge section 152 of the second end 151 and the top sheet 121 is larger compared to the gap between the edge section 152 of the second end 151 and the top sheet 121 of the toilet sheet 120.

Thus, even when pet urine has been transferred onto the top sheet 121 of the toilet sheet 120 and has flowed from the edge section 152 of the second end 151 to the bottom section 132 side, the distance between the lengthwise portion of the second anti-slip member 181 on the second end 151 side of the base section 133 and the edge section 152 of the second end 151 reduces the flow energy of urine that impacts the second anti-slip member 181, allowing stable blockage of urine by the second anti-slip member 181. In addition, the space 154 surrounded by the second anti-slip member 181, the edge section 152 of the second end 151 and the top sheet 121, being larger than the gap between the edge section 152 of the second end 151 and the top sheet 121 of the toilet sheet 120, ensures a widening spatial area. It is therefore possible to diffuse the flow of urine that has energetically flowed in, and to reduce its energy. Blockage of urine by the second anti-slip member 181 can therefore be accomplished in an even more stable manner.

The location of the second anti-slip member 181, i.e. the distance d between the lengthwise portion of the second anti-slip member 181 on the second end 151 side of the base sections 133, and the edge section 152 of the second end 151, is preferably about 3 mm to 30 mm, more preferably about 5 mm to 20 mm and even more preferably about 8 mm to 10 mm.

If the distance d is less than 3 mm, the distance from the edge section 152 of the second end 151 of the cover member 130 in the direction of the first end 141 will be too short, thereby lowering the energy-reducing effect. If it is greater than 30 mm, conversely, the distance will be too long, reducing the middle region 163 and shortening the lengths of the ribs described below, which can potentially weaken the effect of pressing down the toilet sheet 120 and prevent contact between the absorbent body and the second anti-slip member, which may cause elimination of the blocking function.

The distance between the second anti-slip member 181 and the edge section 152 of the second end 151 will depend on the size of the base section 133, but when the base section 133 width is 95 mm, for example, the second anti-slip member 181 is preferably situated at a location about 3 mm to 30 mm from the edge section 152.

Also, the material of the second anti-slip member 181 is preferably an elastic material, such as urethane or a similar foamed material, for example, from the viewpoint of closely bonding the second anti-slip member 181 with the toilet sheet 120 to block urine, and the air bubbles of the foamed material are more preferably closed cells from the viewpoint of preventing urine from permeating through the second anti-slip member 181.

The middle region 163 is provided with the plurality of ribs 164 as mentioned above, each having a bottom surface 165 for at least partial contact with the top surface of the toilet sheet 120.

Each of the ribs 164 extends from the first end 141 of the base section 133 to the second end 151, particularly with the main part of the bottom surface 165 extending in essentially the horizontal direction. Also, for this embodiment, the ribs 164 have their top edges fixed in an immovable manner on the bottom surfaces of the base sections 133, protruding downward from the bottom surfaces of the base sections 133. For this embodiment, the plurality of ribs 164 (five for this embodiment) are disposed at fixed intervals in the lengthwise direction of each base section 133 that corresponds to one side of the frame of the cover member 130.

Also, the ribs 164 formed on the same base section 133 are disposed in a mutually parallel manner, and each of the sections at the four corners of the cover member 110 has a single rib 164 provided at an angle of about 45° with respect to the other adjacent ribs 164, as viewed flat. For this embodiment, five ribs are provided for each side of the square frame-shaped cover member 130, but the number of ribs 164 provided may be any other number.

Also, when the cover member 130 has been set to press down on the toilet sheet 120 while covering a portion thereof, as shown in FIG. 5, the toilet sheet 120 is pressed down so that the bottom surface 165 of each rib 164 contacts with the portion of the top sheet 121 of the toilet sheet 120 corresponding to the outer perimeter edge of the absorbent body 123, or the portion near the flap 124.

Moreover, the height of the bottom surface 165 of each of the ribs 164 in the vertical direction is higher than the height of the bottom surface 172 of the first anti-slip member 171 in the vertical direction, and lower than the height of the bottom surface 182 of the second anti-slip member 181 in the vertical direction. This will naturally ensure strength in the direction from the first end 141 of the cover member 130 toward the second end 151, but will also allow the toilet sheet 120, and especially the flap sections 124, to be reliably pressed down by the ribs 164, thereby more stably preventing shifting of the cover member 130 with respect to the toilet sheet 120.

The ribs 164 have recesses 166 formed in curved shapes that are curved in a convex manner upward at locations adjacent to the second end region 153.

The recess 166 is formed as a curved surface continuously curved in a concave manner from the bottom surface 165 of the rib 164 toward the bottom surface of the base section 133 located further upward than the bottom surface 165, and the upper section of the recess 166 presses against the location of the top sheet 121 of the toilet sheet 120 that overlaps with the outer perimeter edge section of the absorbent body 123, while the lower section of the recess 166 is able to press against the flap section 124 of the toilet sheet 120. That is, the recesses press against the sections of the top sheet 121 of the toilet sheet 120 that have level differences produced by the presence of the absorbent body 123, and the ribs 164 as a whole can stably press the toilet sheet 120 regardless of the level differences.

Thus, even when the toilet sheet 120 tends to move toward the cover member 130, such as when the pet has dashed onto the toilet sheet 120, the section of the top sheet 121 with a level difference produced by the presence of the absorbent body 123 can be pressed, preventing shifting between the cover member 130 and the toilet sheet 120. In the case of this embodiment, in particular, wherein the cover member 130 is formed in the shape of a square frame as viewed flat, the curving directions (convex directions) of the recesses 166 of the ribs 164 of the base sections 133, 133 disposed at opposite locations to each other are reciprocal directions. Therefore, even if movement of the pet produces force causing the cover member 130 to move in the direction of the base section 133, the curved surface of the recesses 166 of the ribs 164 of the base section 133 located on the side opposite that direction become caught at the section of the top sheet 121 of the toilet sheet 120 that has a level difference, thereby stopping movement of the cover member 130, and allowing the toilet sheet 120 to be kept even more stably pressed.

Incidentally, at the bottom section 132 of the cover member 130, the height of the bottom surface of the second end 151 in the vertical direction is higher than the height of the bottom surface 182 of the second anti-slip member 181 in the vertical direction. Also, the height of the bottom surface 182 of the second anti-slip member 181 in the vertical direction is higher than the heights of the bottom surfaces of the ribs 164 and the bottom surface of the first end 141 in the vertical direction, while the heights of the bottom surfaces 165 of the ribs 164 and the bottom surface of the first end 141 in the vertical direction is higher than the height of the bottom surface 172 of the first anti-slip member 171 in the vertical direction.

Since the bottom section 132 of the cover member 130 thus has its protrusion adjusted at each portion according to the shape of the top surface of the toilet sheet 120 (more specifically, it is concavoconvex to match the flat shape of the absorbent body and the shape of the outer perimeter edge of the toilet sheet 120), the function of each portion of the bottom section 132 is more stably exhibited. In other words, this can ensure the anti-slip function of the first anti-slip member 171 that prevents shifting against the floor surface 111, the anti-slip function and urine blocking function of the second anti-slip member 181 against the toilet sheet 120, the function of the second anti-slip member 181 that presses the top sheet 121 of the toilet sheet 120 against the floor surface 111, and the function of the ribs 164 that presses the toilet sheet 120 against the floor surface 111.

The weight of the cover member 130 is determined in consideration of the minimum weight necessary to press down the toilet sheet 120 by only the weight of the cover member 130, and the maximum weight from the viewpoint of easy portability. For this embodiment, the weight of the cover member will differ depending on the size of the cover member, but may be in the range of 0.5 kg to 3.0 kg, more preferably 0.5 to 2.0 kg and even more preferably 0.5 to 1.0 kg, with a weight of about 0.8 kg being realistic from the viewpoint of pressing down of the toilet sheet 120 and easy portability.

The material used to form the cover member may be, for example, a resin material such as polyethylene, polypropylene, vinyl chloride resin, polystyrene, ABS resin, AS resin, a polyester resin such as polyethylene terephthalate, polyamide resin, polycarbonate resin or acrylic resin. It may also be a metal such as stainless steel instead.

When the material for forming the cover member is a resin material, it is preferably formed by injection molding, but when the material is one other than a resin material, there is no limitation to injection molding, and instead formation by adhesion with an adhesive after cutting may be used, for an acrylic resin, or formation by welding after cutting, for a metal.

At the top section 131, the inclined surface 131a of the base section 133 is preferably subjected to non-slip treatment, such as surface texturing, to help prevent slipping of the legs of the pet.

With the toilet 110 having the construction described above, the toilet sheet 120 is spread out onto a prescribed location of the floor surface, and the cover member 130 is used to cover a portion of the toilet sheet 120 while the bottom surfaces 172 of the first anti-slip members 171 contact with the floor surface 111. The second anti-slip members 181 are contacted against the sections of the top sheet 121 of the toilet sheet 120 where the absorbent body 123 is present, with the ribs 164 against the sections of the toilet sheet 120 near the flap sections 124, so that the toilet sheet 120 is pressed by the cover member 130.

Even if the pet has kicked the cover member 130, for example, frictional force acts between the cover member 130 and the floor surface 111 under the gravitational weight of the cover member 130, thereby minimizing movement of the cover member and helping to prevent shifting between the cover member 130 and the floor surface 111, so that the position of the toilet 110 as a whole does not shift.

Moreover, even when pet urine flows over the top sheet 121 of the toilet sheet 120 toward the second anti-slip member 181 on the bottom surface side of the cover member 130, flow of the urine on the top sheet 121 can be blocked by the second anti-slip member 181.

Moreover, the cover member 130 has a construction preventing shifting between the cover member 130 and the floor surface 111 and shifting between the cover member 130 and the toilet sheet 120, by the first anti-slip members 171, the second anti-slip members 181 and the ribs 164 composing it, the construction being very simple overall, and being relatively easy to set regardless of the height of the cover member 130. It is therefore possible to minimize the height of the toilet 110 as a whole, and to reduce to a minimum any feeling of apprehension by the pet such as a dog against stepping over or onto the cover member 130, which is caused by the height of the toilet, and allow it to move onto the toilet sheet 120 with as little resistance as possible.

The form of the toilet sheet 120 for this embodiment may be an essentially square sheet as viewed flat, or it may instead have a rectangular or triangular shape.

For this embodiment, the cover member 130 is formed as a square frame shape as viewed flat, but the shape of the cover member as viewed flat may instead be a square U-shape or an L-shape.

This will allow the pet to enter and leave the pet toilet sheet through the region lacking the cover member, thereby reducing the likelihood of the pet contacting the cover member and allowing the pet to move to the toilet sheet in a relatively easy manner, while also minimizing the likelihood of shifting between the cover member and the toilet sheet, or shifting between the cover member and the floor surface. By combining two cover members that have essentially square U-shapes or L-shapes, the overall form can be made into a frame, as viewed flat.

Figure 6:
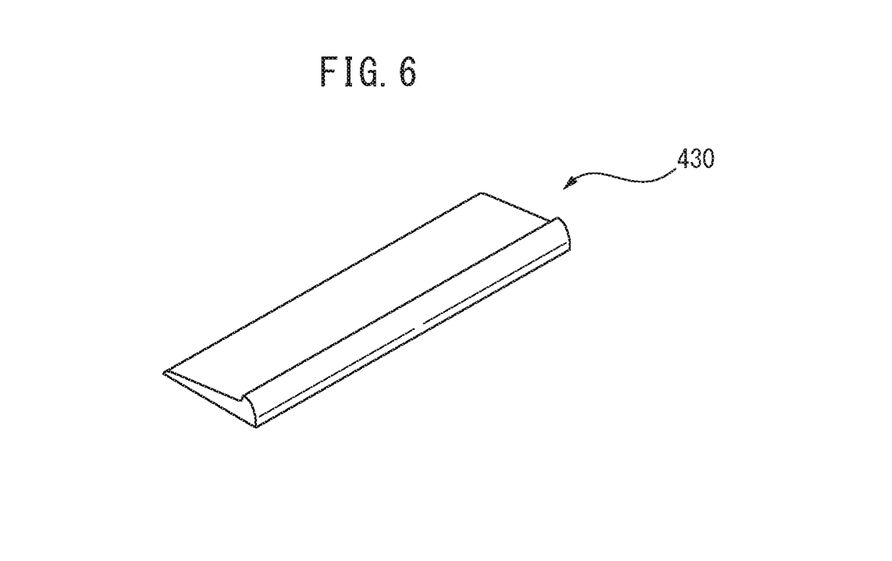
FIG. 6 is a perspective view schematically showing another embodiment of the cover member of the present invention.

The cover member may have a straight linear shape as viewed flat, as with the cover member 430 shown in FIG. 6, for example.

This will allow the cover member 430 to be disposed more freely in a narrow space, than when the cover member has a frame-like shape or an essentially square U-shaped or essentially L-shaped form. In addition, since the pet will be able to enter and leave the pet toilet sheet through the region where the cover member 430 is not present, this reduces the likelihood of the pet contacting the cover member 430, and lowers the likelihood of shifting between the cover member and the toilet sheet or shifting between the cover member and the floor surface. It is essential for the cover member 430 to be placed on the toilet sheet with the first member in contact with the floor surface and the second member in contact with the top sheet of the toilet sheet (particularly the sections where the absorbent body is present). If necessary, a plurality of cover members 430 may be used together and the toilet sheet pressed down against them.

This cover member 430 differs from the embodiment described above in its shape as viewed flat, while having basically the same construction and effect in its other aspects, and therefore they will not be explained in detail again.

Figure 7:
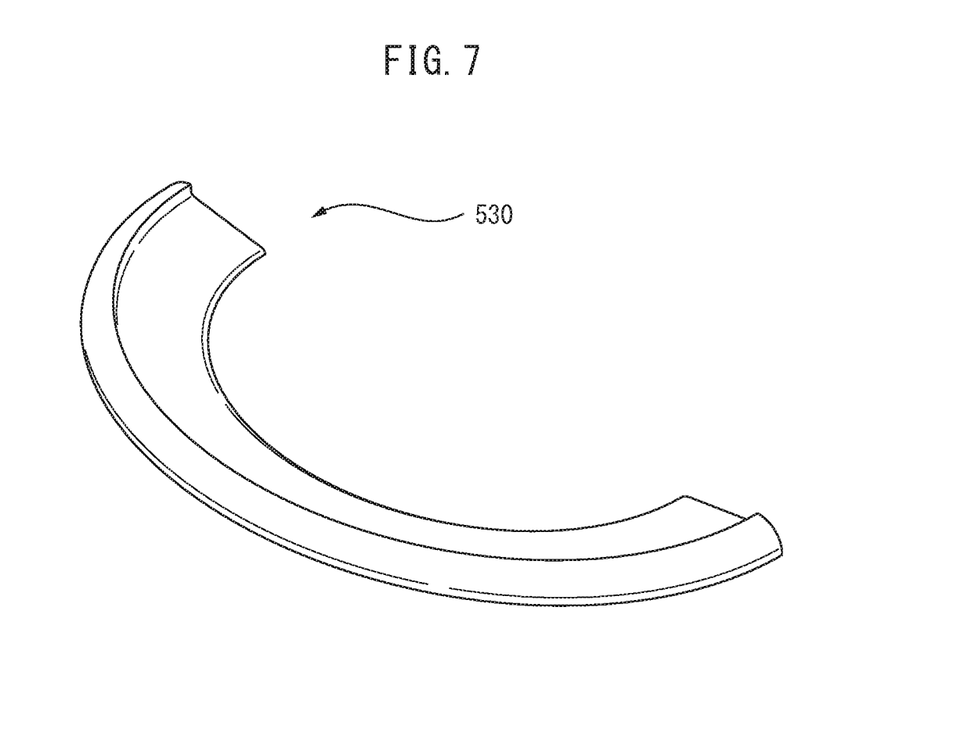
FIG. 7 is a perspective view schematically showing yet another embodiment of the cover member of the present invention.

The cover member may have an arc shape as viewed flat, as with the cover member 530 shown in FIG. 7, for example. In this case, since the cover member 530 has a rounded construction, the pet may be expected to experience less discomfort when entering the toilet. It is essential for the cover member 530 to be placed on the toilet sheet with the first member in contact with the floor surface and the second member in contact with the top sheet of the toilet sheet (particularly the sections where the absorbent body is present).

Alternatively, the cover member may have a circular frame shape (not shown) as viewed flat, or two cover members 530 with arc shapes as viewed flat may be used together to form an overall circular frame as viewed flat.

If the cover member has an arc shape as viewed flat or a circular frame shape as viewed flat, the shape of the toilet sheet as viewed flat is preferably circular.

This cover member 530 differs from the embodiment described above in its shape as viewed flat, while having basically the same construction and effect in its other aspects, which will not be explained in detail again.

Moreover, for this embodiment, the second anti-slip members 181 used as the second members are disposed at locations separated from the edge sections 152 of the second ends 151 in the direction of the first ends, but the second members do not necessarily have to be separated from the edge sections of the second ends in the direction of the first ends.

In addition, for this embodiment, the ribs 164 of the bottom section 132 of the cover member 130 have recesses 166 formed as curves in a manner curved in a convex manner upward at locations adjacent to the second end regions 153, but such recesses do not necessarily have to be provided and may be omitted so long as it is still possible to reliably prevent positional shifting between the cover member and the toilet sheet.

Furthermore, at the bottom section 132 of the cover member 130 of this embodiment, the heights of the bottom surfaces of the second ends 151 of the cover member 130 in the vertical direction are higher than the heights of the bottom surfaces of the second anti-slip members 181 in the vertical direction, the heights of the bottom surfaces of the second anti-slip members 181 in the vertical direction are higher than the heights of the bottom surfaces of the ribs 164 and the bottom surfaces of the first ends 141 in the vertical direction, and the heights of the bottom surfaces of the ribs 164 and the bottom surfaces of the first ends 141 in the vertical direction are higher than the heights of the bottom surfaces of the first anti-slip members 171 in the vertical direction. However, the relationship between the heights of each section at the bottom section of the cover member may be as desired so long as it is possible to reliably press down the toilet sheet by the cover member so that the toilet sheet does not move, and so long as positional shifting of the toilet as a whole does not take place.

Moreover, for this embodiment, the first anti-slip members 171 as the first members are disposed at locations separated from the edge section 142 of the first end 141 in the direction of the second end 151, but the first members do not have to be separated from the edge section of the first end in the direction of the second end, and instead may be provided in contact with the edge section of the first end.

The invention claimed is:

1. A pet toilet sheet cover member, which is configured to be mounted on a pet toilet sheet that is spread over a floor surface and absorbs excreta from a pet, and to press down the pet toilet sheet in a partially covered state, said cover member comprising:
   a first end and a second end opposite to the first end in a horizontal direction;
   a top section;
   a bottom section;
   a first member;
   a rib; and
   a second member,
wherein
   the bottom section has
      a first end region that includes an edge section on the first end,
      a second end region that includes an edge section on the second end, and
      a middle region between the second end region and the first end region,
   the first member having a bottom surface for contact with the floor surface is disposed in the first end region,
   the rib having a bottom surface, at least a portion of the bottom surface being for contact with a top surface of the toilet sheet, is provided in the middle region, the rib extending from the first end toward the second end,
   the second member having a bottom surface for contact with the top surface of the toilet sheet is provided in the second end region, the second member being disposed extending along the edge section of the second end,
   a bottom surface at the second end in a vertical direction is higher than the bottom surface of the second member in the vertical direction,
   the bottom surface of the second member in the vertical direction is higher than the bottom surface of the rib and a bottom surface of the first end in the vertical direction, and
   the bottom surface of the rib and the bottom surface of the first end in the vertical direction are higher than the bottom surface of the first member in the vertical direction.

2. The pet toilet sheet cover member according to claim 1, wherein the second member is disposed at a location away from the edge section on the second end in a direction of the first end.

3. The pet toilet sheet cover member according to claim 1, wherein the rib has a recess formed in a curved shape that is curved in a convex manner upward at a location adjacent to the second end region.

4. The pet toilet sheet cover member according to claim 1, wherein the first member is disposed away from the edge section at the first end in a direction of the second end.

5. The pet toilet sheet cover member according to claim 1, wherein the cover member is formed as a frame with the second end located on an inner perimeter side of the cover member.

6. A pet toilet comprising:
   a pet toilet sheet cover member; and
   a pet toilet sheet on a top surface of which the pet toilet cover member is to be mounted, wherein the pet toilet sheet comprises a liquid-permeable top sheet, a liquid-impermeable back sheet, and a liquid-absorbing absorbent body disposed between the top sheet and back sheet,
wherein
the cover member includes
   a first end and a second end opposite to the first end in a horizontal direction;
   a top section;
   a bottom section;
   a first member;
   a rib; and
   a second member,
wherein
   the bottom section has
      a first end region that includes an edge section on the first end,
      a second end region that includes an edge section on the second end, and
      a middle region between the second end region and the first end region,
   the first member having a bottom surface for contact with the floor surface is disposed in the first end region,
   the rib having a bottom surface, at least a portion of the bottom surface configured to be in contact with a top surface of the toilet sheet, is provided in the middle region, the rib extending from the first end toward the second end,
   the second member having a bottom surface configured to be in contact with the top surface of the toilet sheet is provided in the second end region, the second member being disposed extending along the edge section of the second end,
   a bottom surface at the second end in a vertical direction is higher than the bottom surface of the second member in the vertical direction,
   the bottom surface of the second member in the vertical direction is higher than the bottom surface of the rib and a bottom surface of the first end in the vertical direction, and
   the bottom surface of the rib and the bottom surface of the first end in the vertical direction are higher than the bottom surface of the first member in the vertical direction.

* * * * *